(12) United States Patent
Doshi et al.

(10) Patent No.: US 10,540,238 B2
(45) Date of Patent: Jan. 21, 2020

(54) ADJUSTING REPLICATION OPERATIONS IN A DISTRIBUTED ENVIRONMENT

(71) Applicant: Veritas Technologies LLC, Mountain View, CA (US)

(72) Inventors: Tushar Doshi, Santa Clara, CA (US); Anish A. Vaidya, San Jose, CA (US); Kushal B. Shah, Santa Clara, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 315 days.

(21) Appl. No.: 15/010,815

(22) Filed: Jan. 29, 2016

(65) Prior Publication Data

US 2017/0220424 A1 Aug. 3, 2017

(51) Int. Cl.
 *G06F 7/00* (2006.01)
 *G06F 17/30* (2006.01)
 *G06F 11/14* (2006.01)
 *G06F 16/27* (2019.01)
 *H04L 12/24* (2006.01)

(52) U.S. Cl.
 CPC ......... *G06F 11/1464* (2013.01); *G06F 16/27* (2019.01); *H04L 41/5019* (2013.01); *G06F 2201/835* (2013.01)

(58) Field of Classification Search
 CPC ........... G06F 11/1464; G06F 17/30575; G06F 707/634; G06F 16/27; G06F 11/2094; G06F 11/2097

USPC .......... 707/634, 674, 827, 611, 613
See application file for complete search history.

(56) References Cited

U.S. PATENT DOCUMENTS

| | | | |
|---|---|---|---|
| 7,389,300 B1 * | 6/2008 | Shah | G06F 11/1482 |
| 8,332,354 B1 | 12/2012 | Chatterjee et al. | 707/624 |
| 8,775,549 B1 * | 7/2014 | Taylor | H04L 67/1097 707/609 |
| 9,110,918 B1 | 8/2015 | Rajaa et al. | 707/613 |
| 2006/0129562 A1 | 6/2006 | Pulamarasetti et al. | 707/10 |
| 2007/0294310 A1 * | 12/2007 | Yagawa | G06F 17/30067 |
| 2010/0191884 A1 * | 7/2010 | Holenstein | G06F 11/2094 710/200 |
| 2012/0054533 A1 * | 3/2012 | Shi | G06F 11/2094 714/4.1 |
| 2016/0359968 A1 * | 12/2016 | Chitti | H04L 67/1095 |
| 2017/0147625 A1 * | 5/2017 | Eells | G06F 17/30371 |

\* cited by examiner

*Primary Examiner* — Md I Uddin
(74) *Attorney, Agent, or Firm* — Campbell Stephenson LLP

(57) ABSTRACT

Disclosed herein are methods, systems, and processes to adjust replication operations in a distributed environment. A set of replicated data is received from a first appliance as a result of a replication operation. The replication operation is initiated by the first appliance and the set of replicated data includes a first timestamp. A write operation is performed to store the set of replicated data and a second timestamp is recorded. Recovery point information is generated based on the first timestamp and the second timestamp. The recovery point information is configured to be utilized in adjusting replication parameters of a subsequent replication operation.

13 Claims, 10 Drawing Sheets

| Replication Adjustment Table 305 | | | | | | | |
|---|---|---|---|---|---|---|---|
| Host Identifier 255 | Host 110 | Set of Replicated Data 150 | First Timestamp 265 | Second Timestamp 280 | Replication Lag 310 | Meets Threshold? 315 | Action 320 |
| 255(1) | 110(1) | 150(1) | 10:00 a.m. | 10:10 a.m. | 10 minutes | Yes | Maintain replication parameter(s) |
| 255(2) | 110(2) | 150(2) | 10:05 a.m. | 10:25 a.m. | 20 minutes | No | Adjust replication parameter(s) |
| 255(3) | 110(3) | 150(3) | 10:00 a.m. | 10:10 a.m. | 10 minutes | No | Adjust replication parameter(s) |
| 255(4) | 110(4) | 150(4) | 10:10 a.m. | 10:40 a.m. | 30 minutes | No | Increase Network Bandwidth |
| 255(5) | 110(5) | 150(5) | 10:10 a.m. | 10:50 a.m. | 40 minutes | No | Increase I/O Bandwidth |
| ... | ... | ... | ... | ... | ... | ... | ... |
| 255(N) | 110(N) | 150(N) | 10:00 a.m. | 10:00 p.m. | 12 hours | No | Adjust replication parameter(s) |

ADJUSTING REPLICATION OPERATIONS IN A DISTRIBUTED ENVIRONMENT

FIELD OF THE DISCLOSURE

The present disclosure relates to data replication and, more particularly, to adjusting replication operations in a distributed environment.

DESCRIPTION OF THE RELATED ART

Appliances can be hardware devices with integrated software or virtual devices (e.g., pre-configured virtual machine images created by installing software appliances on virtual machines). Appliances can be designed and configured to perform replication operations. Unlike general purpose computers, appliances are not designed to allow end users to change the software (including the underlying operating system). In this manner, appliances are designed to be secure black boxes for end users (e.g., customers).

Data replication involves replicating data associated with application input/output (I/O) operations over a network to remote sites, making the replicated data available for processing (e.g., data backup, disaster recovery, data mining, or the like). In certain replication environments, I/Os from an application or operating system are continuously tapped and transmitted to a first appliance. The first appliance then replicates the received data to a second appliance residing on a remote site (e.g., a data center, a cloud, or the like). Replicating data from the first appliance to the second appliance results in replication lag.

Replication lag refers to a delay between the time the replicated data is stored (or written) by the second appliance (e.g., to a secondary storage device in the cloud) and the time the data was generated. (e.g., by an application). Replication lag associated with replication operations in a distributed environment can result in the breach of one or more Service Level Agreements (SLAs).

SUMMARY OF THE DISCLOSURE

Disclosed herein are methods, systems, and processes to adjust replication operations in a distributed environment. One such method involves receiving a set of replicated data from a first appliance as a result of a replication operation. The replication operation is initiated by the first appliance and the set of replicated data includes a first timestamp. The method then performs a write operation to store the set of replicated data and records a second timestamp. The method then generates recovery point information based on the first timestamp and the second timestamp. The recovery point information is configured to be utilized in adjusting replication parameters of a subsequent replication operation.

In some embodiments, the method transmits the recovery point information to the first appliance. The recovery point information is configured to be utilized by the first appliance to perform the adjustment (of replication parameters). The recovery point information is generated by calculating a replication lag associated with the set of replicated data based on a difference between the first timestamp and the second timestamp.

In other embodiments, the recovery point information includes the second timestamp and the replication lag. The replication lag corresponds to a host (of multiple hosts). In this example, the hosts are communicatively coupled to the first appliance and the hosts generate data that is part of the set of replicated data stored by the write operation.

In certain embodiments, the method receives updates to a log. In this example, the updates are performed by the first appliance upon receiving the recovery point information and the log includes recovery point information associated the hosts. The updates are received as part of the subsequent replication operation.

In one embodiment, upon generating the recovery point information, the method accesses Service Level Agreement (SLA) information. The SLA information represents one (or multiple) service level objectives defined by an SLA. The SLA information includes a threshold applicable to the host and the threshold corresponds to one (or multiple) requirements regarding (or associated with) replication of data generated by the host.

In another embodiment, the method compares the recovery point information for the host with the threshold and determines, based on the comparison, whether the requirements are met by the replication operation or whether the requirements can be met (or fulfilled) by the subsequent replication operation.

In some embodiments, the data generated by the host is part of the set of replicated data and the set of replicated data is written to a secondary storage device as part of the write operation. In other embodiments, the method adjusts the replication parameters or generates a notification with instructions to adjust the replication parameters if the requirements cannot be met (or fulfilled).

In certain embodiments, the first appliance is a premise (or primary) appliance. The premise (or primary) appliance stores in-flight data generated by the hosts. In this example, the secondary storage device is associated with a second appliance (e.g., a cloud appliance). The cloud appliance stores the in-flight data as part of the set of replicated data.

In one or more embodiments, the method adjusts (or provides a recommendation or notification to a user to adjust) the replication parameters by increasing a network bandwidth associated with the first appliance or by increasing an input/output (I/O) bandwidth of the secondary storage device.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 3 is a replication adjustment table, according to one embodiment of the present disclosure.

Figure 1:
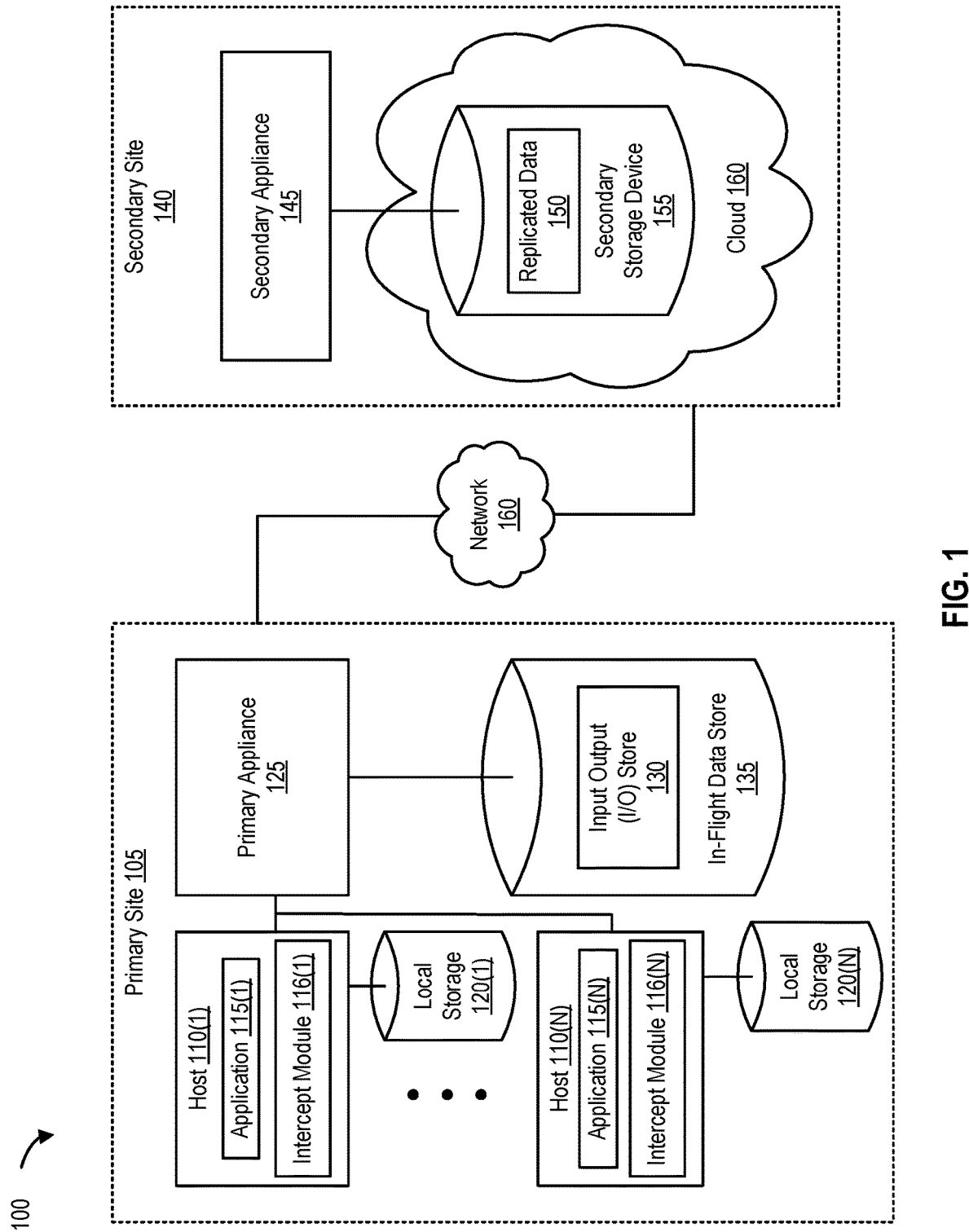
FIG. 1 is a block diagram of a distributed replication system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

FIG. 1 is a block diagram of a distributed replication system, according to one embodiment. In this example, such a distributed replication system includes at least two sites—a primary site 105 and a secondary site 140. Primary site 105 and secondary site 140 can be data centers, clusters, cloud environments, and the like. Primary site 105 and secondary site 140 are communicatively coupled to each other via network 160. Network 160 can include any type of network or interconnection (e.g., the Internet, a Wide Area Network (WAN), a Storage Area Network (SAN), and the like).

Primary site 105 includes hosts 110(1)-(N). Each host execute one (or more) applications and uses a local storage. For example, host 110(1) executes application 115(1) and uses a local storage 120(1). Local storage 120(1) can be used to store I/Os generated by application 115(1). Primary site 105 also implements a primary appliance 125 (e.g., a premise appliance). Primary appliance 125 can be any of a variety of different computing devices, including a server, personal computing device, laptop computer, cellular phone, or the like. Primary appliance 125 can also execute any of a variety of different software programs (e.g., a data replication program product), and can be executed by one or more virtual machines.

As shown in FIG. 1, and in one embodiment, host 110(1) and primary appliance 125 are communicatively coupled to each other via a Local Area Network (LAN) or via a direct connection. Therefore, in this example, in-flight data (e.g., I/Os from application 115(1) stored in local storage 120(1)) transmitted from host 110(1) to primary appliance 125 is received by primary appliance 125 almost instantaneously and/or with negligible lag. Primary appliance 125 stores I/Os received from host 110(1) in an I/O Store 130. I/O store 130 is stored in an in-flight data store 135 associated with primary appliance 125. Intercept module 116(1) intercepts I/Os from application 115(1). Local storage 120(1)-(N) and in-flight data store 135 can include one or more of a variety of different storage devices, including hard disks, one or more solid state drives (SSDs), memory, and the like, or one or more logical storage devices such as volumes.

Secondary site 140 includes a secondary appliance 145 (e.g., second/cloud appliance) and a cloud 160. Cloud 160 includes a secondary storage device 155. Secondary storage device 155 stores replicated data received by secondary appliance 145 from primary appliance 125. Like local storage 120(1)-(N) and in-flight data store 135, secondary storage device 155 can include one or more of a variety of different storage devices, including hard disks, compact discs, digital versatile discs, one or more solid state drives (SSDs), memory such as Flash memory, and the like, or one or more logical storage devices, and the like, or one or more logical storage devices such as volumes implemented on one or more such physical storage devices.

Examples of Calculating Recovery Point Information (RPI)

Figure 2A:
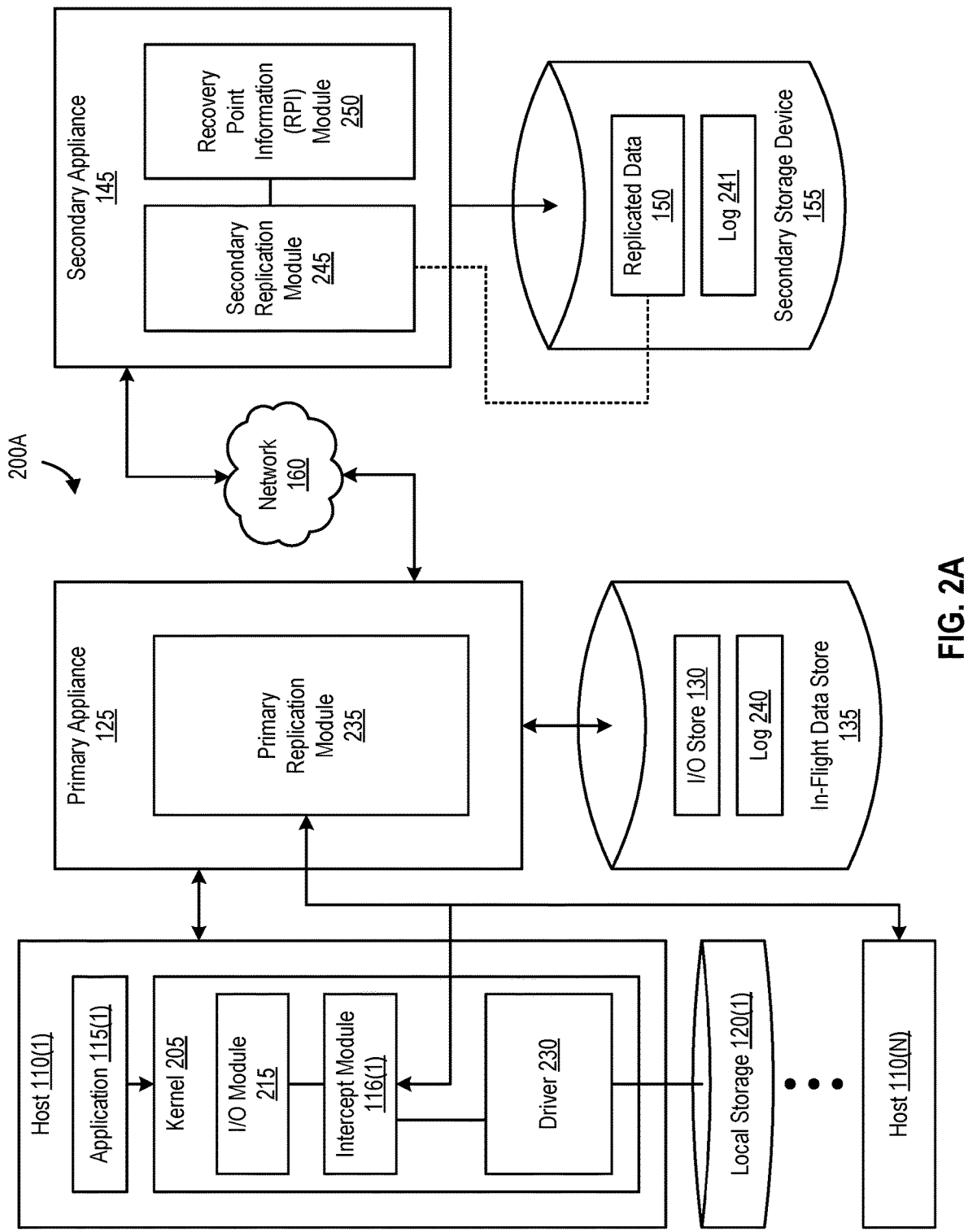
FIG. 2A is a block diagram of a recovery point information module implemented in a distributed replication system, according to one embodiment of the present disclosure.

FIG. 2A is a block diagram of a recovery point information module implemented in a distributed replication system, according to one embodiment. According to FIG. 2A, host 110(1), in addition to executing application 115(1), includes kernel 205. Kernel 205 implements an intercept module 116(1), an I/O module 215, and a driver 230. I/Os from application 115(1) are intercepted by intercept module 116(1). Once intercepted, I/O module 215 determines that whether the I/Os include any writes (e.g., whether the application is generating new data or modifications to existing data). If the I/Os include writes, intercept module 116(1) receives these writes from write module 220 and transmits (or sends) those writes (or I/Os) to primary appliance 125.

As shown in FIG. 2A, primary appliance 125 includes a primary replication module 235. Primary replication module 235 performs replication operations on data received from host 110(1). Primary appliance 125 also maintains a log 240 (e.g., a catalogue) in in-flight data store 135 to keep track of and manage I/Os in I/O store 130. Log 240 can also keep track of manage replicated data that is replicated to secondary appliance 145. Therefore log 240 can track and manage data that is received from host 110(1) for replication, as well as data that is sent to secondary appliance 145 for replication. Primary replication module 235 can update log 240 after the performance of one or more replication operations as well as after the replicated data is stored on (or written to) secondary storage device 155 by secondary appliance 145. In this manner, primary appliance 125 acts as a staging area for data generated by host 110(1).

Also as shown in FIG. 2A, secondary appliance 145 includes a secondary replication module 245 and recovery point information (RPI) module 250. Secondary replication module 245 receives replicated data 150 from primary appliance 125 as the result of a replication operation performed by primary replication module 235. Secondary replication module 245 then stores (or writes) replicated data 150 to secondary storage device 155. Secondary appliance 145 also includes a log 241. Log 241 keeps track of and manages replicated 150. RPI module 250 can update log 241 after secondary replication module 245 stores (or writes) replicated data 150 to secondary storage device 155.

Figure 2B:
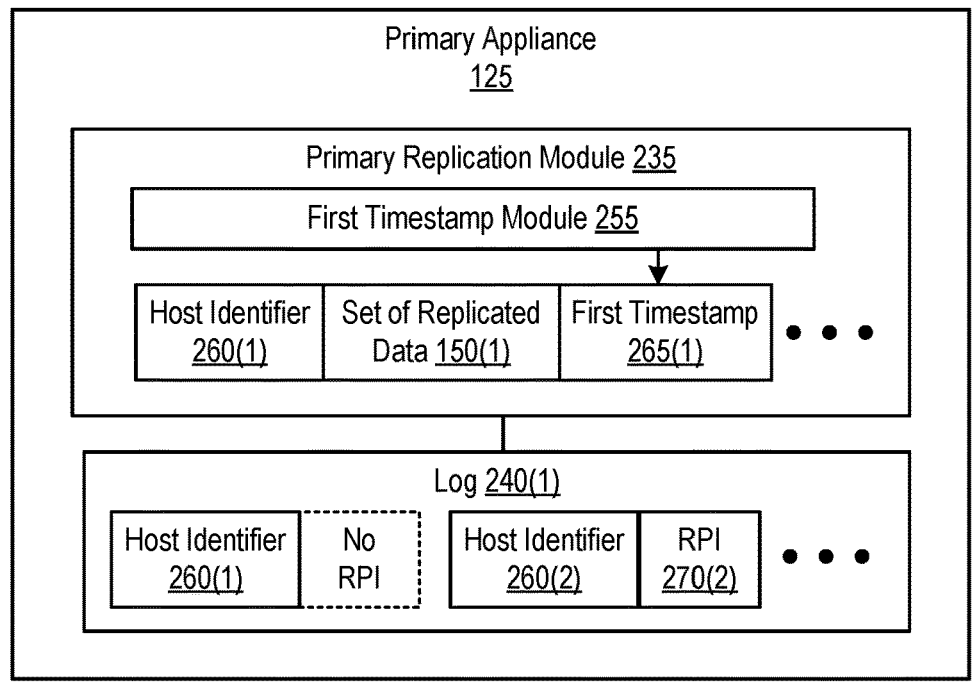
FIG. 2B is a block diagram of a primary appliance that performs replication operations, according to one embodiment of the present disclosure.
Figure 2C:
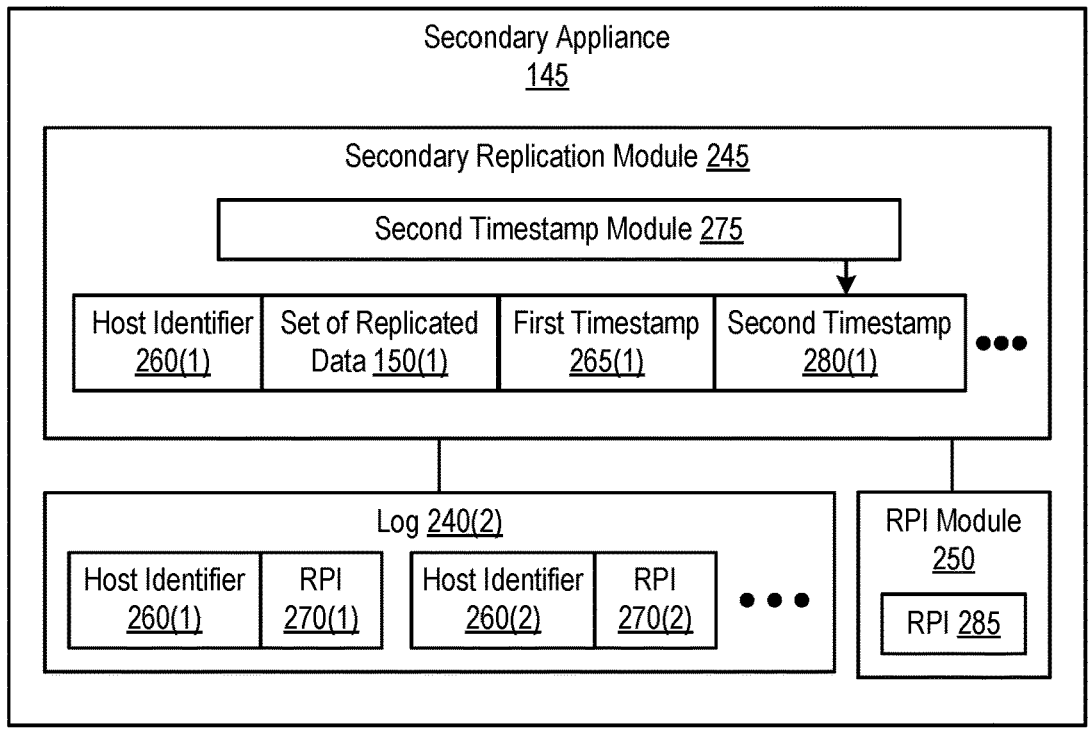
FIG. 2C is a block diagram of a secondary appliance that stores replicated data and determines recovery point information, according to one embodiment of the present disclosure.

FIG. 2B is a block diagram of a primary appliance that performs replication operations and FIG. 2C is a block diagram of a secondary appliance that stores replicated data and determines recovery point information, according to certain embodiments. In one embodiment, secondary appliance 145 receives (e.g., via secondary replication module 245) a set of replicated data 150(1) from primary appliance 125 (e.g., a first appliance or a premise appliance). Set of replicated data 150(1) is received from primary appliance 125 as part of a replication operation performed by primary replication module 235.

In this example, the replication operation is initiated by primary appliance 125. As shown in FIG. 2B, primary replication module 235 on primary appliance 125 initiates the replication operation and also generates a first timestamp 265(1) (e.g., as part of the replication operation). Primary replication module 235 determines that set of replicated data 150(1) is received from (or generated by) host 110(1) using a host identifier 260(1). When set of replicated data 150(1) is received by primary appliance 125 or when set of replicated data 150(1) is sent from primary appliance 125 to secondary appliance 145, primary replication module 235 generates first timestamp 265(1) for set of replicated data 150(1) identified by host identifier 260(1). For example, primary replication module 235 can generate first timestamp 265(1) to record the time at which data (e.g., generated by application 115(1) executing on host 110(1)) that is used to generate set of replicated data 150(1) is received by primary appliance 125, or can record the time at which primary replication module 235 sends (or transmits) set of replicated data 150(1) to secondary appliance 145. First timestamp 165(1) is sent to secondary appliance 145 in a control packet (along with other first timestamps).

As noted, primary replication module 235 generates and assigns first timestamp 265(1) to set of replicated data A and transmits set of replicated data 150(1) (along with host identifier 260(1) and first timestamp 265(1)) to secondary appliance 145. In certain embodiments, secondary appliance 245 receives set of replicated data 150(1) from primary appliance 125. Primary appliance 125 then uses secondary replication module 245 to perform a write operation to store set of replicated data 150(1) (e.g., in secondary storage device 155). Secondary replication module 245 also records a second timestamp 280(1) (e.g., after secondary replication module 245 receives confirmation from secondary storage device 155 that the write operation is successful and/or has been completed). In some examples, secondary replication module 245 can record second timestamp 285(1) before, during, or after the write operation.

After secondary replication module 245 performs the write operation to store set of replicated data 150(1), RPI module 250 generates recovery point information (RPI) 285 based on first timestamp 265(1) and second timestamp 280(1). RPI 285 is configured by RPI module 250 to be utilized (e.g., either by secondary appliance 145 or primary appliance 125) to adjust one or more replication parameters related to (or associated with) a subsequent replication operation (e.g., performed by primary replication module 235 or secondary replication module 245).

In some embodiments, RPI module 250 transmits (or sends) RPI 285 to primary appliance 125. RPI 285 is configured by RPI module 250 to be utilized by primary appliance 125 to adjust one or more replication parameters (e.g., of a subsequent replication operation). In this example, RPI 285 is generated (e.g., by RPI module 250) by calculating a replication lag associated with set of replicated data 150(1). The replication lag is based on a time difference between first timestamp 265(1) and second timestamp 285(1).

In certain embodiments, RPI 285 includes second timestamp 280(1) as well as the replication lag (e.g., associated with set of replicated data 150(1)). In this example, the replication lag corresponds to host 110(1) (of multiple other hosts in primary site 105). In an alternate example, multiple hosts can generate data that is part of set of replicated data 150(1) stored by the write operation, and therefore, a replication lag calculated by RPI module 250 can correspond to more than one host.

In one embodiment, RPI module 250 receives updates to log 240. In this example, the updates are performed by primary replication module 235 upon receiving RPI 285 (from secondary appliance 145). Log 240 includes recovery point information (e.g., replication lag) associated with multiple hosts (e.g., hosts 110(1)-(N)) based on the replication operation that is performed by primary appliance 125 and the write operation performed by secondary appliance 145. RPI module 250 receives updates to log 240 as part of a subsequent replication operation performed by primary replication module 235 and stores updates to log 240 as part of log 240 maintained on secondary storage device 155.

Examples of Adjusting Subsequent Replication Operations Using RPI

In one embodiment, upon generating RPI 285, either RPI module 250, secondary replication module 245, and/or primary replication module 235 can access Service Level Agreement (SLA) information. For example, SLA information applicable to host 110(1) can be stored on secondary storage device 155, in-flight data store 135, or on local storage 120(1). In this example, the SLA information can represent one or more service level objectives defined by an SLA (e.g., a service level objective to store a set of replicated data on secondary appliance 145 within 30 minutes of the data being generated by application 115(1) executing on host 110(1)). The SLA information applicable to host 110(1) also includes a threshold that corresponds to one or more requirements regarding (or associated with) replication of data generated by host 110(1) (e.g., requirements that the replication of data generated by host 110(1) should be prioritized in some manner, or that a replication operation performed for data generated by host 110(1) must be stored on secondary storage device 155 within 10 minutes of being generated or being received by primary appliance 125, and the like).

In another embodiment, RPI module 250 compares recovery point information (e.g., RPI 285) for host 110(1) and determines, based on the comparison, whether the requirements necessitated by the threshold are met by the replication operation, or whether the requirements can be met by a subsequent replication operation (pending adjustments). RPI module 250 adjusts the replication parameters or generates a notification with instructions to adjust the replication parameters if the requirements cannot be met by subsequent replication operation(s).

If replication parameters need adjusting (e.g., because RPI module 250 determines that subsequent replication operation(s) cannot fulfill the requirements of the threshold identified in the SLA information), RPI module 250 can perform one or more adjustments to replication parameters associated with a replication operation (or a subsequent replication operation). For example, RPI module can increase or decrease an I/O bandwidth of secondary storage device 155. The adjusting of replication parameters can also be performed by primary replication module 235. For example, primary replication module 235 can adjust replication parameters of a subsequent replication operation by increasing or decreasing a network bandwidth associated with primary appliance 125.

FIG. 3 is a replication adjustment table, according to one embodiment. As shown in FIG. 3, and in one embodiment, primary replication module 235 uses host identifier 255(1) to identify host 110(1). Host identifier 255(1) is received from host 110(1) each time host 110(1) sends data to primary appliance 125 (e.g., for replication). Primary replication module 235 generates set of replicated 150(1) from all or part of the data received from host 110(1). Primary replication module 235 then records a first timestamp of 10:10 a.m. for set of replicated data 150(1). The first timestamp can be sent to secondary appliance 145 as part of the replication operation or separately. For example, primary replication module 235 can record first stamps for multiple hosts that are sending data to primary appliance 125 for replication, and can send these first time stamps to secondary appliance 145 in bulk (e.g., in the form of a control packet).

Once secondary replication module 245 receives set of replicated data 150(1), secondary replication module 245 records a second timestamp of 10:10 a.m. to set of replicated data 150(1) and writes set of replicated data 150(1) to secondary storage device 155. As noted, the second timestamp of 10:10 a.m. can be recorded by secondary replication module 245 before or during the writing of set of replicated data 150(1), or by RPI module 250 after the writing of set of replicated data 150(1). RPI module 250 then calculates the replication lag associated with the most recently completed replication operation by subtracting the time of the first timestamp from the time of the second timestamp. In this example, the replication lag for performing a replication operation associated with set of replicated data 150(1) generated by host 110(1) is 10 minutes (10:10 a.m. minus 10:00 a.m.).

RPI module 250 then sends recovery point information that includes the replication lag as well as the second timestamp to primary appliance 125. In one embodiment, RPI module 250 accesses SLA information associated with host 110(1). RPI module 250 determines whether the recovery point information associated with receiving, writing, and/or storing set of replicated data 150(1) meets a threshold specified in the SLA information. If the recovery point information meets the threshold, RPI module 250 maintains the replication parameter(s). For example, the SLA information for host 110(1) can specify a threshold of 15 minutes for the generated data to be received, written, and/or stored to secondary storage device 115. In this example, the calculated recovery point information indicates that the replication lag is 10 minutes. Therefore, the recovery point information in this example meets the threshold and no adjustment of replication parameter(s) are required (or necessary).

In another embodiment, primary appliance 125 (e.g., primary replication module 235) receives the recovery point information (e.g., RPI 285) from secondary appliance 145 (e.g., from RPI module 250). Primary replication module 235 then determines whether the received recovery point information meets a threshold by accessing the SLA information and also adjusts one or more replication parameters (if required). Therefore, although it may be advantageous for RPI module 250 to calculate the recovery point information (given the potential for network bottlenecks between the primary appliance and the secondary appliance), adjusting replication parameters can be performed by either RPI module 250 or by primary replication module 235.

As shown in FIG. 3, and in other embodiments, primary replication module 235 uses host identifier 255(4) to identify host 110(4). Host identifier 255(4) is received from host 110(4) each time host 110(4) sends data to primary appliance 125 (e.g., for replication). Primary replication module 235 generates set of replicated data 150(4) from all or part of the data received from host 110(4). Primary replication module 235 then records a first timestamp of 10:10 a.m. for set of replicated data 150(4). Once secondary replication module 245 receives set of replicated data 150(4), secondary replication module 245 records a second timestamp of 10:40 a.m. to set of replicated data 150(4) and writes set of replicated data 150(4) to secondary storage device 155. As noted, the second timestamp of 10:10 a.m. can be recorded before, during, or after the writing of set of replicated data 150(4).

RPI module 250 then calculates the replication lag associated with the most recently completed replication operation by subtracting the time of the first timestamp from the time of the second timestamp. In this example, the replication lag for performing a replication operation associated with set of replicated data 150(4) generated by host 110(4) is 30 minutes (10:40 a.m. minus 10:00 a.m.). RPI module 250 then sends recovery point information that includes the replication lag as well as the second timestamp to primary appliance 125.

In one embodiment, RPI module 250 or primary replication module 235 access SLA information associated with host 110(4) to determine whether the recovery point information associated with receiving, writing, and/or storing set of replicated data 150(4) meets a threshold specified in the SLA information. If the recovery point information does not meet the threshold, RPI module 250 or primary replication module 235 adjusts one or more replication parameters. For example, primary replication module 235 can determine that the recovery point information (e.g., the replication lag) does not meet the specified threshold because multiple sets of data from host 110(4) are piling up on primary appliance 125 (e.g., in I/O store 130). Primary replication module 235 can then determine that the reason for the pile up of data sets from host 110(4) on primary appliance 125 is because of insufficient network bandwidth (e.g., WAN bandwidth). Primary replication module 235 can then increase (or generate a notification to a system administrator to) increase the network bandwidth of primary appliance 125. A subsequent replication operation would then be able to avail itself of the increased network bandwidth and the recovery point information of the subsequent replication operation would meet (or exceed) the threshold specified in the SLA information and required by the SLA.

Similarly, RPI module 250 can determine that the recovery point information (for host 110(4)) does not meet the specified threshold because multiple sets of replicated data are piling up on secondary appliance 145. RPI module 250 can then determine that the reason for the pile up is because of insufficient I/O bandwidth and can increase (or generate a notification to a system administrator to) increase the I/O bandwidth of secondary appliance 145. A subsequent replication operation would then be able to avail itself of the increased I/O bandwidth and the recovery point information of the subsequent replication operation would meet (or exceed) the threshold specified in the SLA information and required by the SLA.

Processes to Calculate RPI and Adjust Replication Operations

Figure 4:
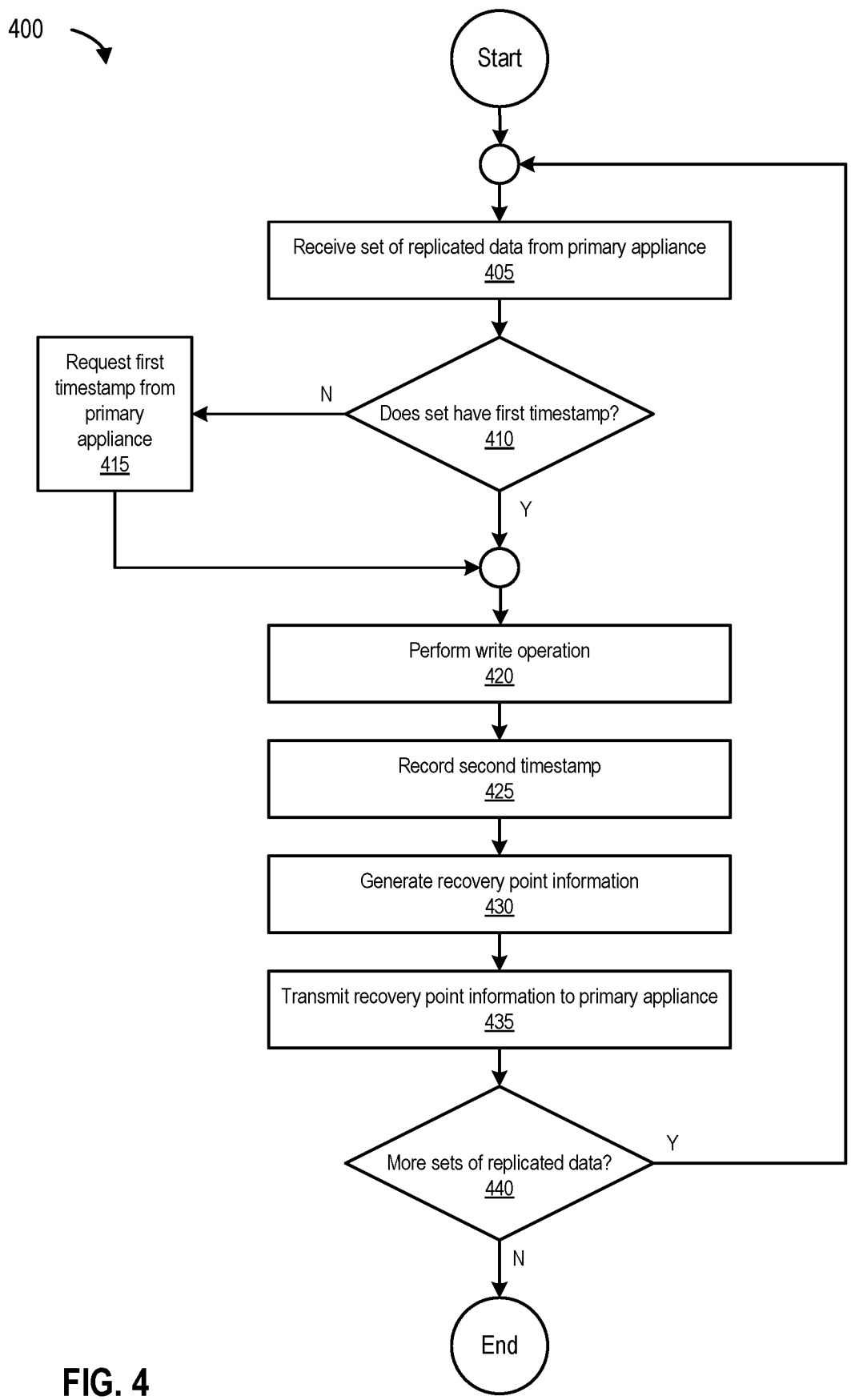
FIG. 4 is a flowchart and illustrates a process for transmitting recovery point information to a primary appliance, according to one embodiment of the present disclosure.

FIG. 4 is a flowchart and illustrates a process for transmitting or sending recovery point information to a primary appliance, according to one embodiment. The process begins at 405 by receiving a set of replicated data (e.g., set of replicated data 150(1)) from a primary appliance (e.g., primary appliance 125). At 410, the process determines whether the set of replicated data has a first timestamp. If the set of replicated data does not have a first timestamp, the process, at 415, requests the first timestamp from the primary appliance.

If the set of replicated data has a first timestamp, the process, at 420, performs a write operation, and at 425, records a second timestamp. As noted, the second timestamp can be recorded before, during, or after the write operation. At 430, the process generates recovery point information (e.g., replication lag and the second timestamp), and at 435, transmits or sends the recovery point information to the primary appliance. The process ends at 440 by determining whether there are more sets of replicated data to write (e.g., to secondary storage device 155).

Figure 5:
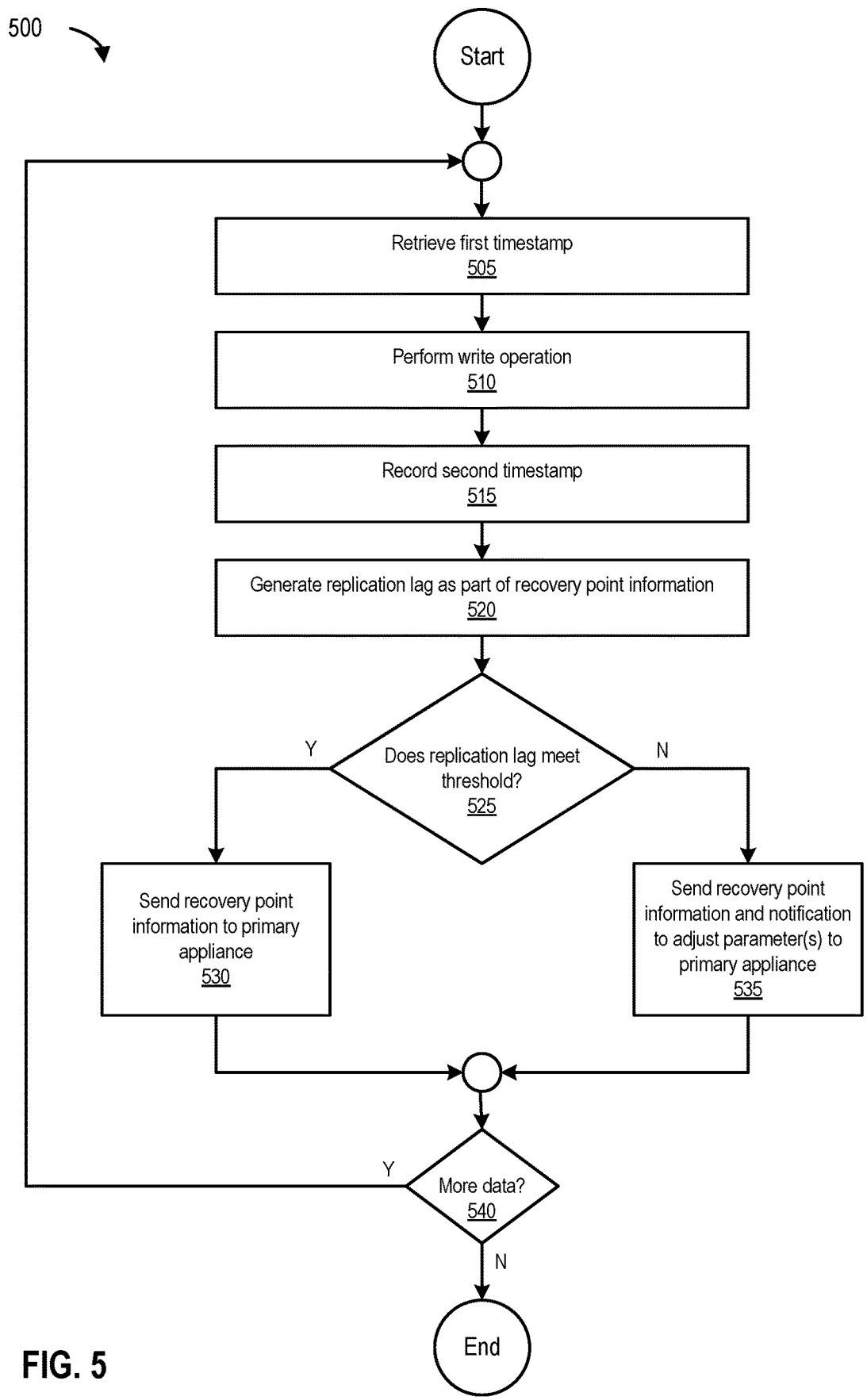
FIG. 5 is a flowchart and illustrates a process for determining whether a replication lag meets a threshold, according to one embodiment of the present disclosure.

FIG. 5 is a flowchart and illustrates a process for determining whether recovery point information calculated for a host meets a threshold, according to one embodiment. The process begins at 505 by retrieving (e.g., from primary appliance 125) a first timestamp (e.g., associated with a set of replicated data received from a primary appliance). At 510, the process performs a write operation, and at 515, records a second timestamp (e.g., for the set of replicated data stored as a result of the write operation).

At 520, the process generates (or calculates) replication lag as part of also determining, generating, and/or calculating recovery point information. At 525, the process determines whether the replication lag meets a threshold (e.g., by accessing SLA information). If the replication lag meets the specified threshold, the process, at 530, sends the recovery point information (or nothing/no data) to the primary appliance. However, if the replication lag does not meet the threshold, the process, at 535, sends the recovery point information as well as a notification specifying one or more parameters that require adjustment to the primary appliance. The process ends at 540 by determining whether more data requires processing.

Figure 6:
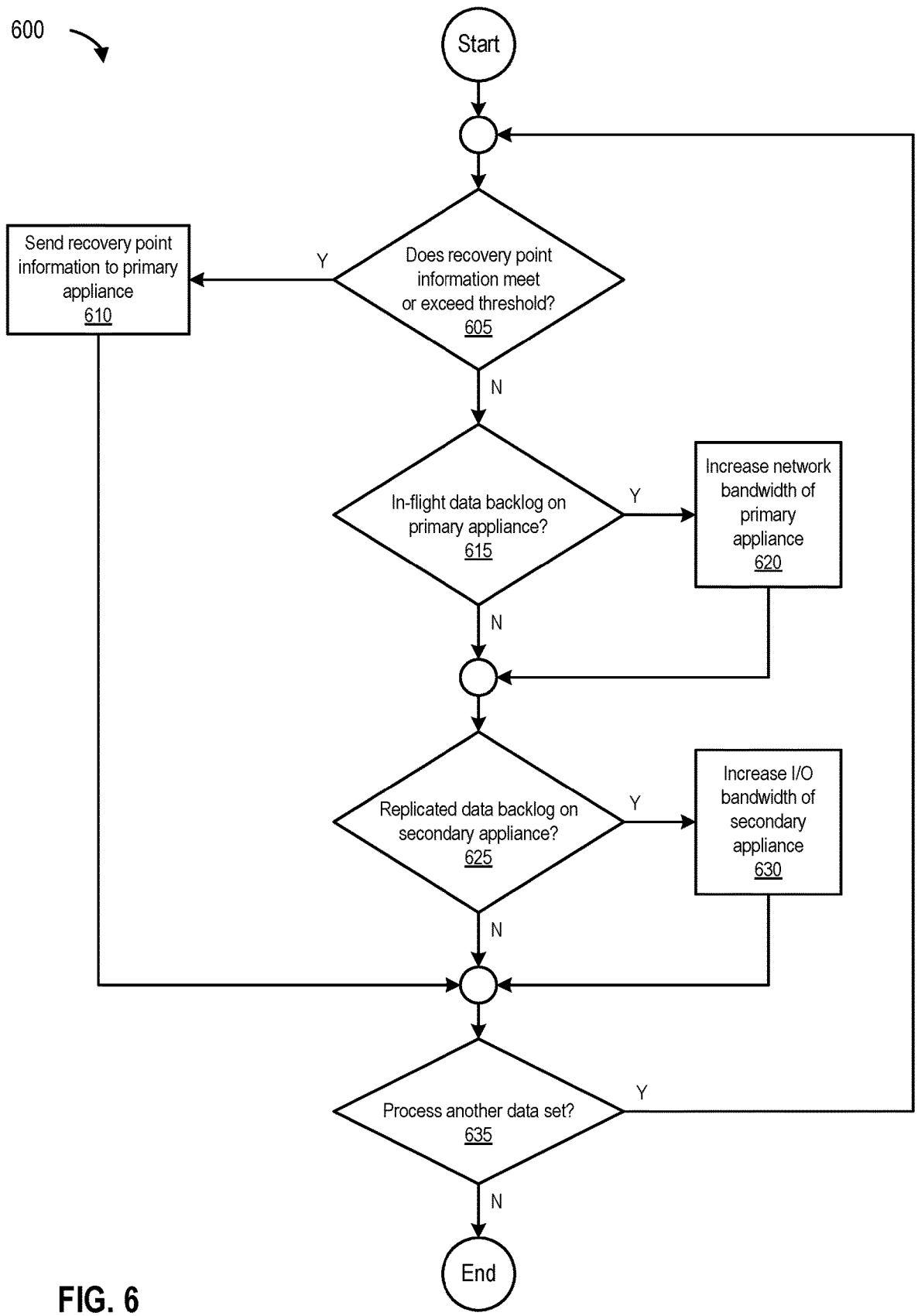
FIG. 6 is a flowchart that illustrates a process for processing recovery point information, according to one embodiment of the present disclosure.

FIG. 6 is a flowchart that illustrates a process for processing recovery point information, according to one embodiment. The process begins at 605 by determining whether the recovery point information meets or exceeds a threshold (e.g., by accessing SLA information that is part of an SLA associated with one or more hosts). If the recovery point information meets or exceeds the threshold, the process, at 610, sends the recovery point information to a primary appliance (e.g., to be updated in log 240). It should be noted that log 240 is a historic log and includes recovery point information for various hosts based on multiple replication operations at multiple points in time. In this manner, this historical information can be used to perform adjustments to subsequent replication operations or to prioritize replication operations performed for data from one host over another (less important) host.

If the recovery point information does not meet or exceed the threshold, the process, at 615, determines whether there is an in-flight data backlog on the primary appliance. If there is an in-flight data backlog on the primary appliance, the process, at 620, increases the network bandwidth of the primary appliance and/or reduces data flow from hosts (or generates a notification and/or a recommendation to do the same). However, if there is no in-flight data backlog on the primary appliance, the process, at 625, determines whether there is a replicated data backlog on a secondary appliance. If there is a replicated data backlog on the secondary appliance, the process, at 630, increases the I/O bandwidth of the secondary appliance, increases buffer space at the primary site, and/or sends a message to the hosts to reduce data flow (or generates a notification and/or recommendation to do the same). However, if there is no replicated data backlog on the secondary appliance, the process ends at 635 by determining whether there is another data set (e.g., set of replicated data) to process.

Figure 7:
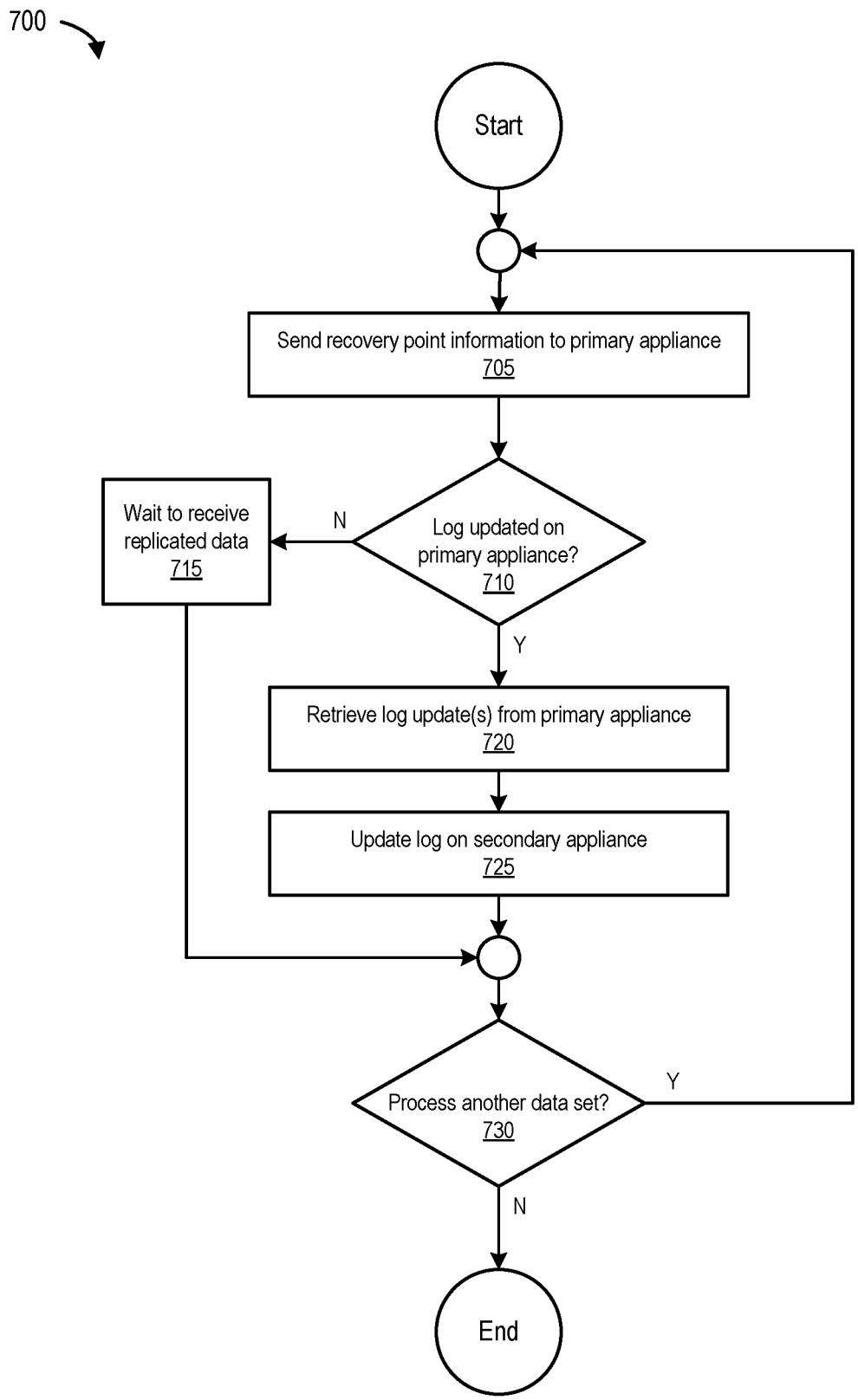
FIG. 7 is a flowchart that illustrates a process for receiving updates from a primary appliance, according to one embodiment of the present disclosure.

FIG. 7 is a flowchart that illustrates a process for receiving updates from a primary appliance, according to one embodiment. The process begins at 705 by sending recovery point information to a primary appliance. At 710, the process determines whether the log (e.g., log 240) has been updated on the primary appliance. If the log has not been updated on the primary appliance (e.g., indicating that the replicated data stored in the cloud is current and up-to-date), the process, at 715, waits to receive replicated data (e.g., from the primary appliance as part of a replication operation or a subsequent replication operation).

If the log has been updated on the primary appliance, the process, at 720, retrieves update(s) to the log from the primary appliance, and at 725, updates the log on the secondary appliance (e.g., log 241). The process ends at 730 by determining whether there is another set of data to process.

It should be noted that the recovery point information (e.g., RPI 285) is generated (or calculated) based on data written by an application (e.g., application 115(1))—not on elapsed time. Therefore, calculating recovery point information and sharing this recovering point information between a primary and a secondary appliance can be used to adjust replication operations in a distributed environment. Adjusting replication operations in this manner can be helpful to a company and/or organization in meeting one or more SLA requirements and/or obligations related to replication operations in distributed environments.

An Example Computing Environment

Figure 8:
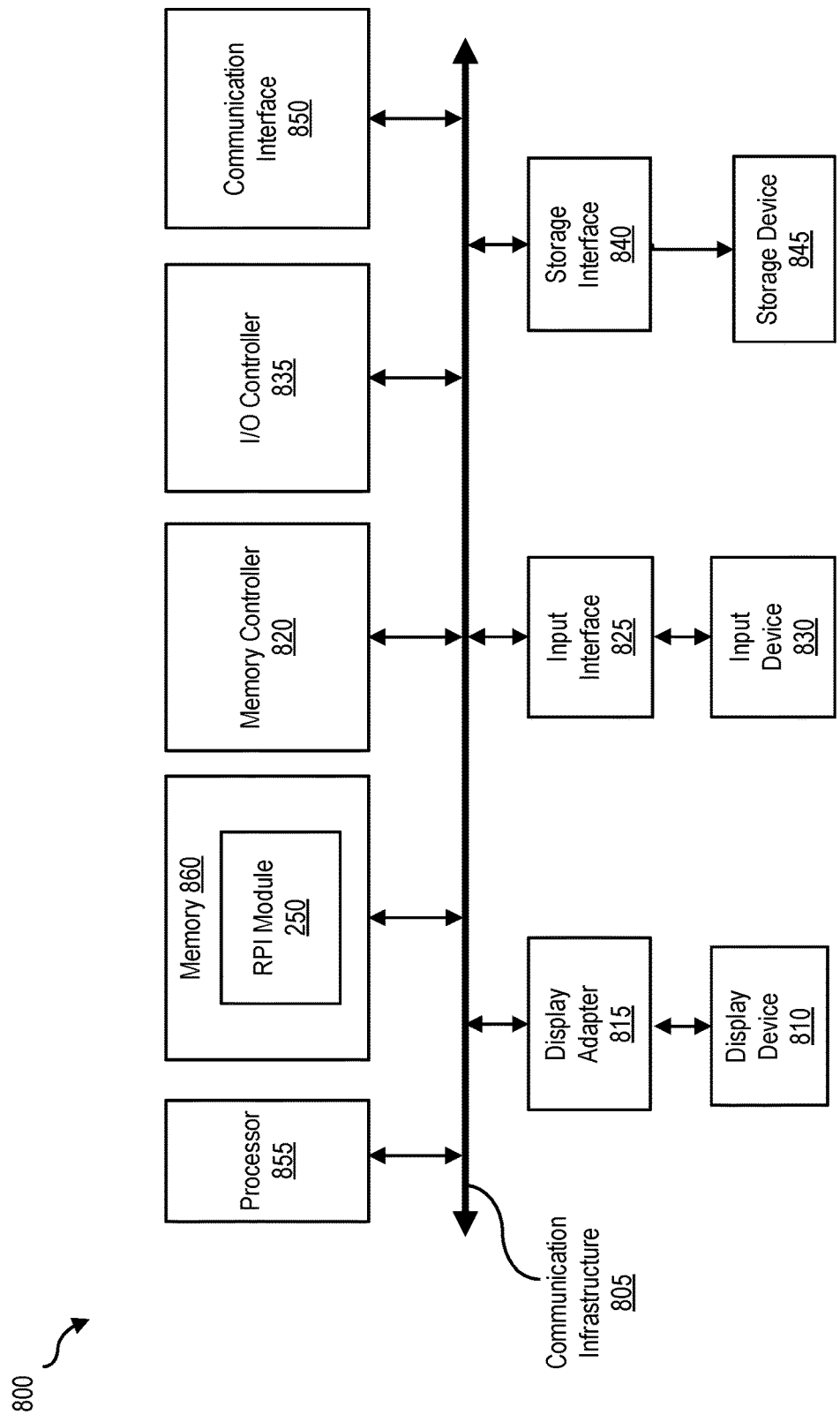
FIG. 8 is a block diagram of a computing system, illustrating how a recovery point module can be implemented in software, according to one embodiment of the present disclosure.

FIG. 8 is a block diagram of a computing system, illustrating how a recovery point module can be implemented in software, according to one embodiment. Computing system 800 represents any single or multi-processor computing device or system capable of executing computer-readable instructions. Computing system 800 can include, without limitation, one or more devices including workstations, personal computers, laptops, client-side terminals, servers, distributed computing systems, handheld devices, network appliances, storage controllers, and the like. Computing system 800 may include at least one processor 855 and a memory 860. By executing the software that implements primary appliance 125 and/or secondary appliance 145, computing system 800 becomes a computing device configured to adjust replication operations.

Processor 855 generally represents any type or form of processing unit capable of processing data or interpreting and executing instructions. Processor 855 may receive instructions from a software application or module. These instructions may cause processor 855 to perform the functions of one or more of the embodiments described and/or illustrated herein. For example, processor 855 may perform and/or be a means for performing all or some of the operations, methods, or processes described and/or illustrated herein.

Memory 860 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing an RPI module 250 may be loaded into memory 860.

In certain embodiments, computing system 800 may also include one or more components or elements in addition to processor 855 and memory 860. For example, as illustrated in FIG. 8, computing system 800 may include a memory controller 820, an Input/Output (I/O) controller 835, and a communication interface 850, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (e.g., Industry Standard Architecture (ISA), Peripheral Component Interconnect (PCI), PCI express (PCIe), or similar bus) and a network.

Memory controller 820 generally represents any type or form of device capable of handling memory or data or controlling communication between one or more components of computing system 800. For example, in certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a computing device. For example, I/O controller 835 may control or facilitate transfer of data between one or more elements of computing system 800, such as processor 855, memory 860, communication interface 850, display adapter 815, input interface 825, and storage interface 840.

Communication interface 850 broadly represents any type or form of communication device or adapter capable of facilitating communication between computing system 800 and one or more additional devices. For example, in certain embodiments communication interface 850 may facilitate communication between the primary and secondary appliances and a private or public network including additional computing systems. Examples of communication interface 850 include, without limitation, a wired network interface (such as a network interface card), a wireless network interface (such as a wireless network interface card), a modem, and any other suitable interface. In at least one embodiment, communication interface 850 may provide a direct connection to a remote server via a direct link to a network, such as the Internet. Communication interface 850 may also indirectly provide such a connection through, for example, a local area network (such as an Ethernet network), a personal area network, a telephone or cable network, a cellular telephone connection, a satellite data connection, or any other suitable connection.

In some embodiments, communication interface 850 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 850 may also allow computing system 800 to engage in distributed or remote computing. Communication interface 850 may receive instructions from a remote device or send instructions to a remote device for execution.

Computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810.

Computing system 800 may also include at least one input device 830 coupled to communication infrastructure 805 via an input interface 825. Input device 830 generally represents any type or form of input device capable of providing input, either computer or human generated, to computing system 800. Examples of input device 830 include, without limitation, a keyboard, a pointing device, a speech recognition device, or any other input device.

Computing system 800 may also include storage device 845 coupled to communication infrastructure 805 via a storage interface 840. Storage device 845 generally represents any type or form of storage devices or mediums capable of storing data and/or other computer-readable instructions. For example, storage device 845 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 845, and other components of computing system 800. In certain embodiments, storage device 845 may be configured to read from and/or write to a removable storage unit configured to store computer software, data, or other computer-readable information. Examples of removable storage units include, without limitation, a floppy disk, a magnetic tape, an optical disk, a flash memory device, or the like. Storage device 845 may also include other similar structures or devices for allowing computer software, data, or other computer-readable instructions to be loaded into computing system 800 (e.g., to read and write software, data, or other computer-readable information). Storage device 845 may also be a part of computing system 800 or may be separate devices accessed through other interface systems.

Other devices or subsystems may be connected to computing system 800. All of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 160 and/or various portions of storage device 845. When executed by processor 855, a computer program loaded into computing system 800 may cause processor 855 to perform and/or be a means for performing the functions of one or more of the embodiments described and/or illustrated herein. Alternatively, embodiments described and/or illustrated herein may be implemented in firmware and/or hardware. For example, computing system 800 may be configured as an application specific integrated circuit (ASIC) adapted to implement one or more of the embodiments disclosed herein.

An Example Networking Environment

Figure 9:
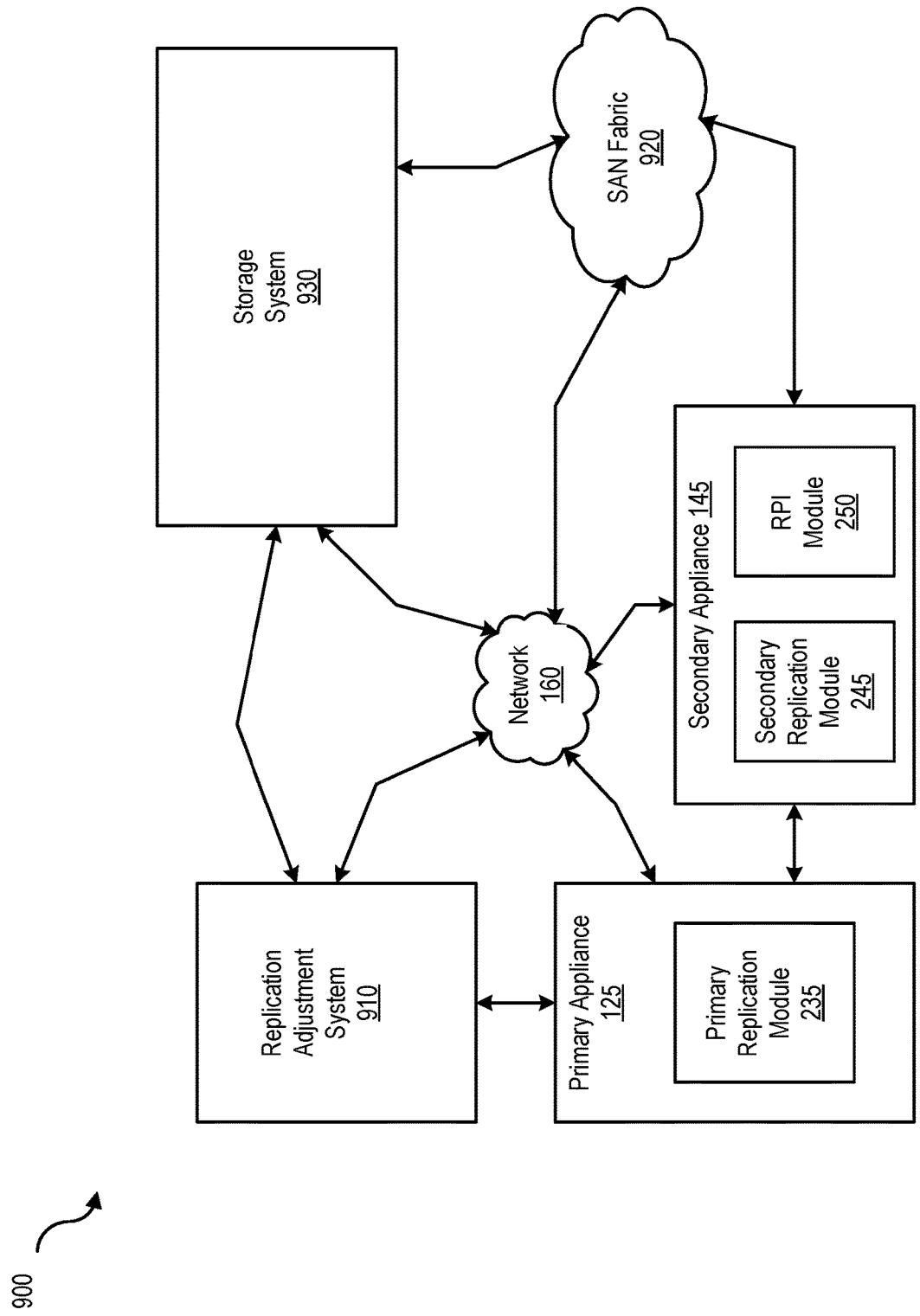
FIG. 9 is a block diagram of a networked system, illustrating how various devices can communicate via a network, according to one embodiment of the present disclosure.

FIG. 9 is a block diagram of a networked system, illustrating how various computing devices can communicate via a network, according to one embodiment. Network-attached storage (NAS) devices may be configured to communicate with primary appliance 125 and/or secondary appliance 145 using various protocols, such as Network File System (NFS), Server Message Block (SMB), or Common Internet File System (CIFS).

Network 160 generally represents any type or form of computer network or architecture capable of facilitating communication between multiple computing devices. Network 160 may facilitate communication between primary appliance 125 and secondary appliance 145. In certain embodiments, a communication interface, such as communication interface 850 in FIG. 8, may be used to provide connectivity between primary appliance 125 and/or secondary appliance 145, and network 160. It should be noted that the embodiments described and/or illustrated herein are not limited to the Internet or any particular network-based environment. For example, network 160 can be a Storage Area Network (SAN).

In at least one embodiment, all or a portion of one or more of the embodiments disclosed herein may be encoded as a computer program and loaded onto and executed by primary appliance 125 and/or secondary appliance 145, or any combination thereof. In addition, all or a portion of one or more of the embodiments disclosed herein may also be encoded as a computer program, stored on primary appliance 125 and/or secondary appliance 145, and distributed over network 160.

In some examples, all or a portion of the computing devices in FIGS. 1, 2A, 2B, and 2C may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, primary appliance 125 and/or secondary appliance 145 may transform behavior of a computing device, cluster, and/or server in order to cause the computing device, cluster, and/or server to adjust (or provide recommendations and/or notifications to adjust, fine tune, modify, and/or change) replication operations in a distributed environment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
receiving, at a node at a recovery site, a set of replicated data from a first appliance,
wherein
the set of replicated data is received as a result of a replication operation initiated by the first appliance, and
the set of replicated data comprises a first timestamp recorded by the first appliance indicating a time at which the set of replicated data was transmitted by the first appliance;
performing a write operation on the recovery site, wherein the write operation comprises
storing the set of replicated data on the recovery site, and
recording a second timestamp that indicates a time at which the write operation was completed on the recovery site;
generating recovery point information, wherein
the recovery point information indicates a lag time, and
the lag time is a difference in time between the time recorded by the first timestamp and the time recorded by the second timestamp;
subsequent to generating the recovery point information, determining whether one or more requirements regarding replication of data generated by a host can be met by a subsequent replication operation, wherein
the determining comprises comparing the recovery point information to a threshold lag time defined in Service Level Agreement (SLA) information,
the SLA information is associated with the host,
the host is communicatively coupled to the first appliance, and
the threshold lag time corresponds to one or more requirements regarding replication of data generated by the host;
in response to a determination that the one or more requirements can be met by the subsequent replication operation, sending the recovery point information to the first appliance, wherein
the lag time is configured to be utilized in adjusting one or more replication parameters of the subsequent replication operation, wherein
the one or more replication parameters comprises
a network bandwidth associated with the first appliance, and
an input/output (I/O) bandwidth associated with the recovery site; and
in response to a determination that the one or more requirements cannot be met by the subsequent replication operation,
determining whether the one or more requirements cannot be met because of either an in-flight data backlog on the first appliance or a replicated data backlog on the recovery site, and
sending a notification with one or more instructions to adjust at least one of the one or more replication parameters, wherein
in response to a determination that the one or more requirements cannot be met because of an in-flight data backlog on the first appliance, the one or more instructions comprise instructions to increase the network bandwidth associated with the first appliance, and in response to a determination that the one or more requirements cannot be met because of a replicated data backlog on the recovery site, the one or more instructions comprise instructions to increase the I/O bandwidth associated with the recovery site.

2. The computer-implemented method of claim 1, further comprising:

transmitting the recovery point information to the first appliance, wherein the recovery point information is configured to be utilized by the first appliance to adjust the one or more replication parameters.

3. The computer-implemented method of claim 2, wherein the recovery point information comprises the second timestamp.

4. The computer-implemented method of claim 2, wherein the time corresponds to the host, the host is one of one or more hosts, the one or more hosts are communicatively coupled to the first appliance, and the one or more hosts generate data that is part of the set of replicated data stored by the write operation.

5. The computer-implemented method of claim 4, further comprising:

receiving updates to a log, wherein the first appliance updates the log upon receiving the recovery point information, the log comprises a plurality of recovery point information associated with the one or more hosts, and the updates are received as part of the subsequent replication operation.

6. The computer-implemented method of claim 4, wherein the data generated by the host is part of the set of replicated data, and the set of replicated data is written to a secondary storage device as part of the write operation.

7. The computer-implemented method of claim 6, wherein the first appliance is a premise appliance, wherein the premise appliance stores in-flight data generated by the one or more hosts; and the secondary storage device is associated with a second appliance, wherein the second appliance is a cloud appliance, and the cloud appliance stores the in-flight data as part of the set of replicated data.

8. The computer-implemented method of claim 1, wherein the SLA information represents one or more service level objectives.

9. A non-transitory computer readable storage medium storage program instructions executable to perform a method comprising:

receiving, at a node at a recovery site, a set of replicated data from a first appliance, wherein the set of replicated data is received as a result of a replication operation initiated by the first appliance, and the set of replicated data comprises a first timestamp recorded by the first appliance indicating a time at which the set of replicated data was transmitted by the first appliance;

performing a write operation on the recovery site, wherein the write operation comprises storing the set of replicated data on the recovery site, and recording a second timestamp that indicates a time at which the write operation was completed on the recovery site;

generating recovery point information, wherein the recovery point information indicates a lag time, and the lag time is a difference in time between the time recorded by the first timestamp and the time recorded by the second timestamp;

subsequent to generating the recovery point information, determining whether one or more requirements regarding replication of data generated by a host can be met by a subsequent replication operation, wherein the determining comprises comparing the recovery point information to a threshold lag time defined in Service Level Agreement (SLA) information, the SLA information is associated with the host, the host is communicatively coupled to the first appliance, and the threshold lag time corresponds to one or more requirements regarding replication of data generated by the host;

in response to a determination that the one or more requirements can be met by the subsequent replication operation, sending the recovery point information to the first appliance, wherein the lag time is configured to be utilized in adjusting one or more replication parameters of the subsequent replication operation, wherein the one or more replication parameters comprises a network bandwidth associated with the first appliance, and an input/output (I/O) bandwidth associated with the recovery site;

in response to a determination that the one or more requirements cannot be met by the subsequent replication operation, determining whether the one or more requirements cannot be met because of either an in-flight data backlog on the first appliance or a replicated data backlog on the recovery site, and sending a notification with one or more instructions to adjust at least one of the one or more replication parameters, wherein in response to a determination that the one or more requirements cannot be met because of an in-flight data backlog on the first appliance, the one or more instructions comprise instructions to increase the network bandwidth associated with the first appliance, and in response to a determination that the one or more requirements cannot be met because of a replicated data backlog on the recovery site, the one or more instructions comprise instructions to increase the I/O bandwidth associated with the recovery site.

10. The non-transitory computer readable storage medium of claim 9, wherein the method further comprises:

transmitting the recovery point information to the first appliance, wherein the recovery point information is configured to be utilized by the first appliance to adjust the one or more replication parameters.

11. The non-transitory computer readable storage medium of claim 10, wherein
the recovery point information comprises the second timestamp.

12. A system comprising:
one or more processors; and
a memory coupled to the one or more processors, wherein
the memory stores program instructions executable by the one or more processors to perform a method comprising:
receiving, at a node at a recovery site, a set of replicated data from a first appliance,
wherein
the set of replicated data is received as a result of a replication operation initiated by the first appliance, and
the set of replicated data comprises a first timestamp recorded by the first appliance indicating a time at which the set of replicated data was transmitted by the first appliance;
performing a write operation on the recovery site, wherein the write operation comprises
storing the set of replicated data on the recovery site, and
recording a second timestamp that indicates a time at which the write operation was completed on the recovery site;
generating recovery point information, wherein
the recovery point information indicates a lag time,
the lag time is a difference in time between the time recorded by the first timestamp and the time recorded by the second timestamp;
subsequent to generating the recovery point information, determining whether one or more requirements regarding replication of data generated by a host can be met by a subsequent replication operation, wherein
the determining comprises comparing the recovery point information to a threshold lag time defined in Service Level Agreement (SLA) information,
the SLA information is associated with the host,
the host is communicatively coupled to the first appliance, and
the threshold lag time corresponds to one or more requirements regarding replication of data generated by the host;
in response to a determination that the one or more requirements can be met by the subsequent replication operation, sending the recovery point information to the first appliance, wherein
the lag time is configured to be utilized in adjusting one or more replication parameters of the subsequent replication operation, wherein
the one or more replication parameters comprises
a network bandwidth associated with the first appliance, and
an input/output (I/O) bandwidth associated with the recovery site;
in response to a determination that the one or more requirements cannot be met by the subsequent replication operation,
determining whether the one or more requirements cannot be met because of either an in-flight data backlog on the first appliance or a replicated data backlog on the recovery site, and
sending a notification with one or more instructions to adjust at least one of the one or more replication parameters, wherein
in response to a determination that the one or more requirements cannot be met because of an in-flight data backlog on the first appliance, the one or more instructions comprise instructions to increase the network bandwidth associated with the first appliance, and
in response to a determination that the one or more requirements cannot be met because of a replicated data backlog on the recovery site, the one or more instructions comprise instructions to increase the I/O bandwidth associated with the recovery site.

13. The system of claim 12, wherein the method further comprises:
transmitting the recovery point information to the first appliance, wherein
the recovery point information is configured to be utilized by the first appliance to adjust the one or more replication parameters, and
the recovery point information comprises the second timestamp.

* * * * *